United States Patent
Wei

(10) Patent No.: US 10,288,834 B2
(45) Date of Patent: May 14, 2019

(54) LENS MODULE

(71) Applicant: Chuandong Wei, Shenzhen (CN)

(72) Inventor: Chuandong Wei, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/412,616

(22) Filed: Jan. 23, 2017

(65) Prior Publication Data

US 2018/0024312 A1    Jan. 25, 2018

(30) Foreign Application Priority Data

Jul. 20, 2016   (CN) ................... 2016 2 0762203 U

(51) Int. Cl.
*G02B 7/02* (2006.01)
*G02B 13/00* (2006.01)

(52) U.S. Cl.
CPC ............ *G02B 7/025* (2013.01); *G02B 7/022* (2013.01); *G02B 13/001* (2013.01)

(58) Field of Classification Search
CPC ...................................... G02B 7/025
USPC .......................................... 359/819
See application file for complete search history.

(56) References Cited

U.S. PATENT DOCUMENTS

| 2004/0042088 A1* | 3/2004 | Ito ................. G02B 7/022 359/819 |
| 2011/0063739 A1* | 3/2011 | Hirata ............. G02B 7/021 359/819 |
| 2011/0069198 A1* | 3/2011 | Ezawa ............. G02B 7/021 348/222.1 |

* cited by examiner

*Primary Examiner* — James C. Jones
(74) *Attorney, Agent, or Firm* — Na Xu; IPro, PLLC

(57) ABSTRACT

A lens module includes a lens barrel having a first bonding surface; a first lens received in the lens barrel and having a second bonding surface which is a side surface of the first lens. At least one of the first bonding surface and the second surface is uneven, and the first bonding surface and the second surface are glued by adhesive. The first bonding surface and the second surface and the adhesive form a gluing structure.

11 Claims, 3 Drawing Sheets

LENS MODULE

FIELD OF THE INVENTION

The present disclosure relates to a lens module with a bonding structure.

DESCRIPTION OF RELATED ART

With progressive development of technology, electronic devices are developed constantly toward intelligent types. In addition to digital camera, portable electronic devices such as iPad, mobile phone and so on are also equipped with lens module to meet the higher requirements of people on the imaging quality of lens module, higher requirements on the reliability of the products. The reliability of the camera module to a great extent is associated with the stability of the bonding structure of the lens module.

Due to the miniaturization of camera module, the bonding structure is generally very small, the bonding area is limited and the bonding strength is very limited, prone to fall off, influencing the reliability of the product.

Therefore, it is necessary to provide an improved lens module to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain this disclosure, not intended to limit this disclosure.

Figure 1:
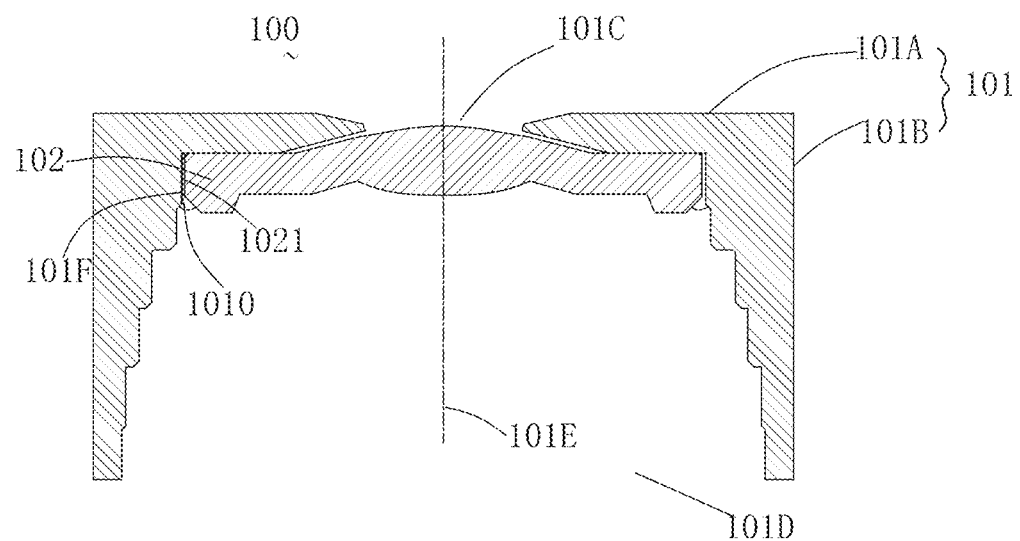
FIG. 1 is an illustration of a lens module in accordance with an exemplary embodiment of the present disclosure.

As shown in FIG. 1, a lens module 100, including an optical axis 101E, in accordance with an exemplary embodiment of the present disclosure comprises a lens barrel 101 and a lens group accommodated in the lens barrel 101. The lens barrel 101 comprises a first barrel wall 101A with an optical aperture 101C, a second barrel wall 101B extending tortuously from the first barrel wall 101A, and an accommodation space 101D formed by the first barrel wall 101A and the second barrel wall 101B. The lens group comprise a first lens 102 attached to a surface of the first barrel wall 101A facing the accommodation space 101D.

A first bonding surface 101F is further arranged on the lens barrel 101, and as an optional alternative, the first bonding surface can also be set in any position on inner wall of a first gluing body.

The first lens 102 is also provided with a second bonding surface 1021 that is glued with the first bonding surface by adhesive 1010, so that the first lens 102 is fixed in the lens barrel 101, and assembly of the lens module 100 is stable.

In this embodiment, both the first bonding surface 101F and the second bonding surface 1021 are uneven, and glued by the adhesive 1010. The first bonding surface 101F, the second bonding surface 1061 and the adhesive 1010 form a gluing structure. In other embodiment, at least one of the first bonding surface and the second bonding surface is uneven.

Figure 2:
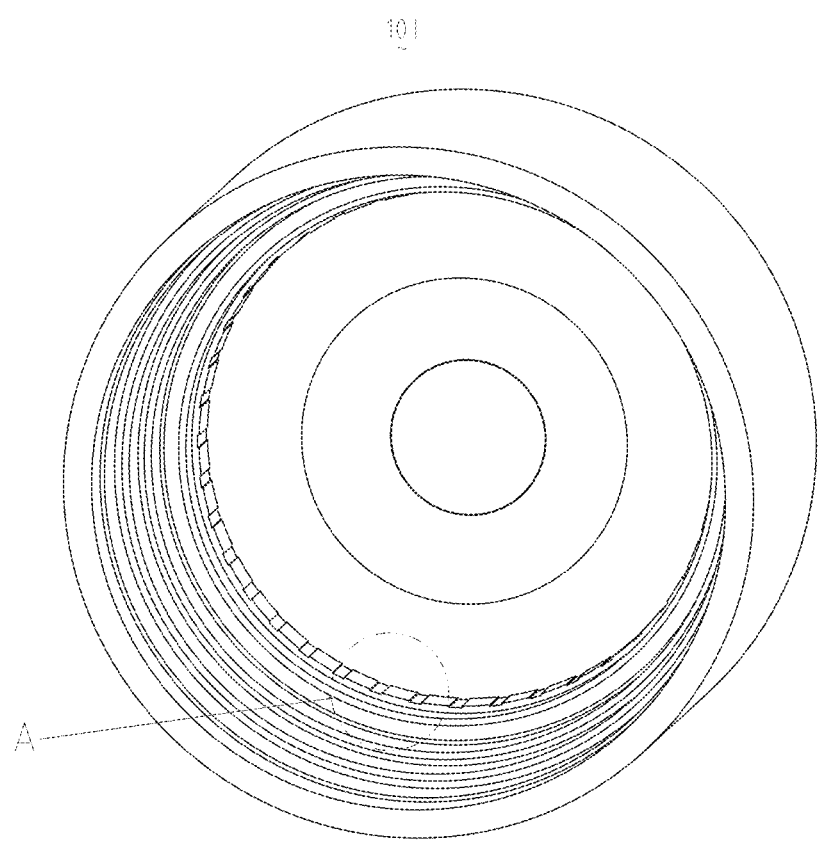
FIG. 2 is an illustration of a lens barrel of the lens module in FIG. 1.
Figure 3:
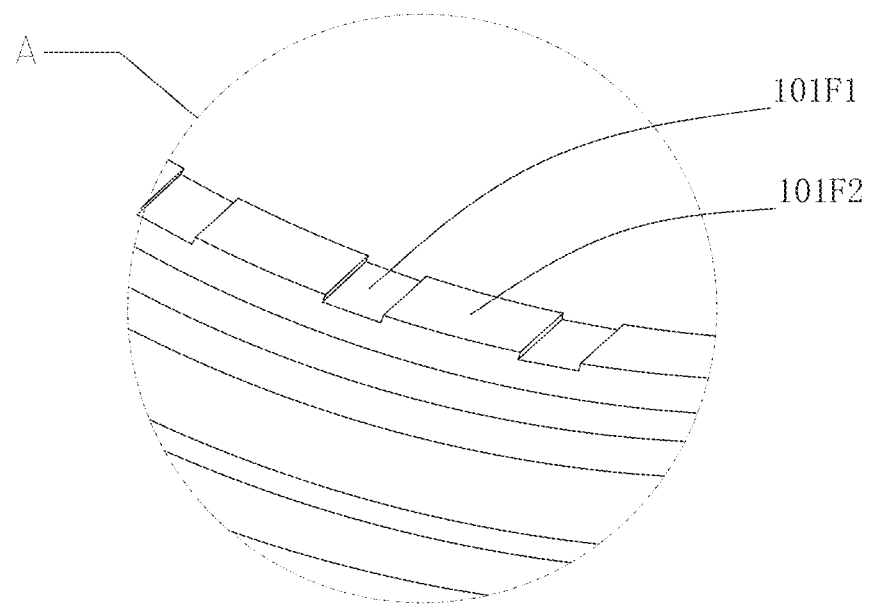
FIG. 3 is an enlarged view of Part A in FIG. 2.

As shown in FIGS. 2-3, the first bonding surface 101F of the lens barrel 101 forms a plurality of first grooves 101F1 and a plurality of first lugs 101F2 arranged in an array. The surface area of the first bonding surface 101F is increased and the contact area of the first bonding surface with the glue 1010 is also increased accordingly. At the same time the intensity of the lens barrel 101 can be improved. Referring FIGS. 1-5, the first lens 102 includes a first object surface 20 and a first image surface 10 opposite to each other, and a lateral surface 30 connecting the first object surface 20 to the first image surface 10. The second bonding surface 1021 is formed on the first lateral surface 30, so that the first lateral surface 30 bonds with the second barrel wall 101B. The second grooves 1023 penetrating the first object surface 20 and the first image surface 10, and the first grooves 101F1 and the second grooves 1023 filled with the adhesive 1010. Each one of the first groove 101F1 separates two adjacent first lugs 101F2 apart, and each one of the second groove 1023 separates two adjacent second lugs 1022 apart. The second grooves 1023 and the second lugs 1022 are evenly distributed on the first lateral surface 30 in circumferential direction. The first grooves 101F1 and the first lugs 101F2 are evenly distributed on the second barrel wall in circumferential direction. Referring to FIG. 5, the first image surface 20 includes a first main surface 20a centered on the optical axis, and a first slope 20b extending from the second main surface 20a towards the first object surface in a direction away from the optical axis, the first slope 20b connecting the first main surface 20a to the first lateral surface 30, with the second groove 1022 extending to the first slope 20b. The first object surface 10 includes a second main surface 10a centered on the optical axis, and a second slope 10b extending from the second main surface 10a towards the first image surface in a direction away from the optical axis, the second slope 10b connecting the second main surface 10a to the first lateral surface 30, with the second groove 1022 extending to the second slope 10b.

Referring back to FIG. 1, in this embodiment, a projection length of the first lug 101F2 on the first barrel wall 101A is not equal to a projection length of the first groove 101F1 on the first barrel wall 101A; in other embodiment, they can be equal.

Figure 4:
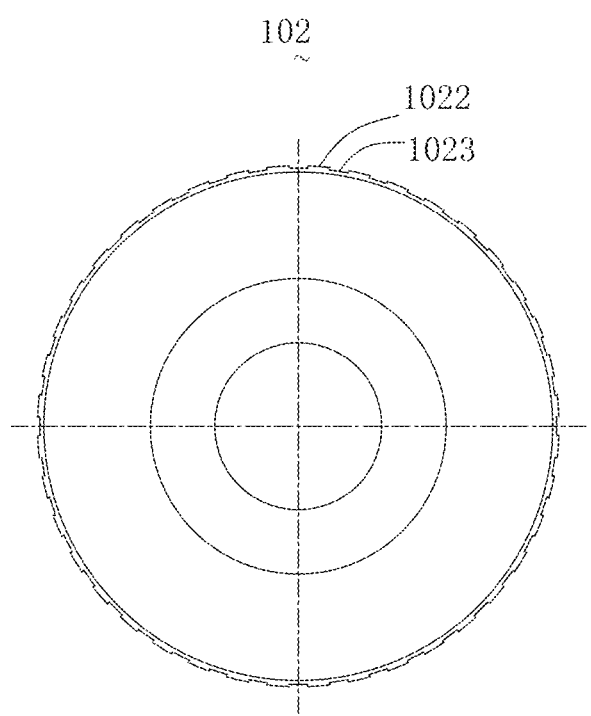
FIG. 4 is a front view of a first lens of the lens module in FIG. 1.
Figure 5:
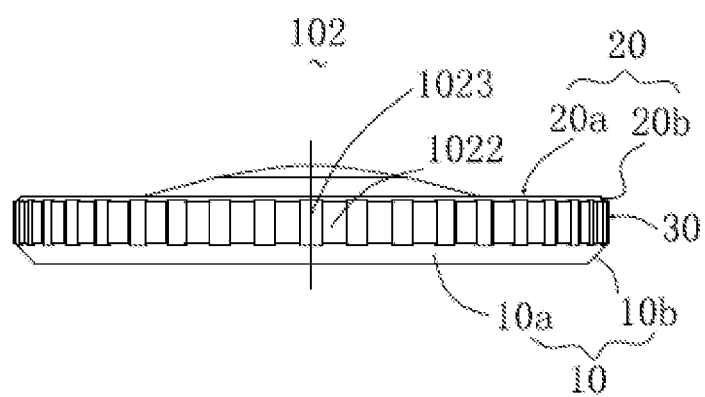
FIG. 5 is a side view of the first lens in FIG. 4.

As shown in FIGS. 4-5, the first lens 102 has a side surface 1021, and the second bonding surface is formed on the side surface 1021. The second bonding surface 1021 is provided with second lugs 1022 and second grooves 1023 in an array. The surface area of the second bonding surface 1021 is increased and the contact area of the second bonding surface with the glue 1010 is also increased accordingly.

A projection length of the second lug 1022 on the first barrel wall 101A is not equal to projection length of the second groove 1023 on the first barrel wall 101A; in other embodiment, they can be also equal.

In this embodiment, sum of the projection length of the first lug 101F2 on the first barrel wall 101A and the projection length of the first groove 101F1 on the first barrel wall 101A is not equal to sum of projection length of the second lug 1022 on the first barrel wall 101A and the projection length of the second groove 1023 on the first barrel wall 101A.

In this embodiment, the lens module includes one piece of lens, and in other embodiment, as per the actual needs, the lens module can also further include at least a second lens set in the lens barrel, and the second lens is stacked at the image side or object side of the first lens along the optical axis, and the second lens and the lens barrel are glued together by the gluing structure, or fixed by other means.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module, having an optical axis, the lens module comprising:
    a lens barrel, comprising a first barrel wall with an optical aperture, and a second barrel wall extending tortuously from the first barrel wall, the first barrel and the second barrel wall forming an accommodation space; and
    a first lens received in the accommodation space, comprising a first object surface and a first image surface opposite to each other, and a lateral surface connecting the first object surface to the first image surface; wherein
    the first lateral surface bonds with the second barrel wall and are glued by adhesive, and the first lateral surface, the second barrel wall and the adhesive form a gluing structure;
    the second barrel wall comprises a plurality of first grooves and a plurality of first lugs arranged in an array, and the first lateral surface comprises a plurality of second grooves and a plurality of second lugs arranged in an array, the second grooves penetrating the first object surface and the first image surface, with the first grooves and the second grooves filled with the adhesive.

2. The lens module as described in claim 1, wherein a projection length of the first lug on the first barrel wall is equal to a projection length of the first groove on the first barrel wall.

3. The lens module as described in claim 1, wherein a projection length of the second lug on the first barrel wall is equal to a projection length of the second groove on the first barrel wall.

4. The lens module as described in claim 1, wherein a sum of the projection length of the first lug on the first barrel wall and the projection length of the first groove on the first barrel wall is equal to a sum of projection length of the second lug on the first barrel wall and the projection length of the second groove on the first barrel wall.

5. The lens module as described in claim 1, wherein each one of the first grooves separates two adjacent first lugs apart.

6. The lens module as described in claim 1, wherein each one of the second grooves separates two adjacent second lugs apart.

7. The lens module as described in claim 1, wherein the second lug protruding towards the second barrel wall, and extends to both the first object surface and the first image surface.

8. The lens module as described in claim 1, wherein the second grooves and the second lugs are evenly distributed on the first lateral surface in circumferential direction.

9. The lens module as described in claim 8, wherein the first grooves and the first lugs are evenly distributed on the second barrel wall in circumferential direction.

10. The lens module as described in claim 1, wherein the first image surface comprises a first main surface centered on the optical axis, and a first slope extending from the second main surface towards the first object surface in a direction away from the optical axis, the first slope connecting the first main surface to the first lateral surface, with the second groove extending to the first slope.

11. The lens module as described in claim 10, wherein the first object surface comprises a second main surface centered on the optical axis, and a second slope extending from the second main surface towards the first image surface in a direction away from the optical axis, the second slope connecting the second main surface to the first lateral surface, with the second groove extending to the second slope.

* * * * *